Jan. 12, 1960  F. J. CARSON ET AL  2,920,423
APPARATUS FOR BENDING GLASS SHEETS
Filed Oct. 7, 1955  2 Sheets-Sheet 1

INVENTORS
Frank J. Carson and
Leslie H. Laine
BY Nobbe & Swope
ATTORNEYS

Jan. 12, 1960  F. J. CARSON ET AL  2,920,423
APPARATUS FOR BENDING GLASS SHEETS
Filed Oct. 7, 1955  2 Sheets-Sheet 2

INVENTORS
Frank J. Carson and
BY Leslie H. Laine
Nobbe & Swope
ATTORNEYS

United States Patent Office 2,920,423
Patented Jan. 12, 1960

2,920,423

APPARATUS FOR BENDING GLASS SHEETS

Frank J. Carson, Toledo, and Leslie H. Laine, Perrysburg, Ohio, assignors to Libbey-Owens-Ford Glass Company, Toledo, Ohio, a corporation of Ohio Application October 7, 1955, Serial No. 539,059

4 Claims. (Cl. 49—67)

The present invention relates generally to the bending of glass sheets or plates, and more particularly to the bending of glass sheets to complex curvatures.

The tendency of automobile stylists and designers is to make increasingly greater use of glass as a part of the automobile body. Moreover, the styling changes are such as to incorporate more sweeping curvatures of both simple and complex formation as a part of the automobile body. When a particular curve, for example, begins with a radius of curvature of rather large magnitude and then has the radius of curvature decreased and, at the same time, has a bend or twist formed therein, it is readily visualized that the bending of a glass sheet or plate to conform to such a curvature is extremely difficult. This is particularly the case when, in addition to the foregoing curvature, the galss sheet has an edge thereof curved to a contour differing from the contour of the body of the sheet.

An important object of the present invention is to provide apparatus for bending glass sheets to complex curvatures.

Another object of the invention is to provide an apparatus for bending a glass sheet and twisting the sheet as it is being bent.

Another object of the invention is to provide an apparatus for bending a glass sheet and forming a curve in an edge of the sheet as it is being bent.

A further object of the invention is to provide an improved bending mold of the type having movable mold section.

Other objects and advantages of the invention will become more apparent during the course of the following description when taken in connection with the accompanying drawings.

In the drawings, wherein like numerals are employed to designate like parts throughout the same:

Figure 1:
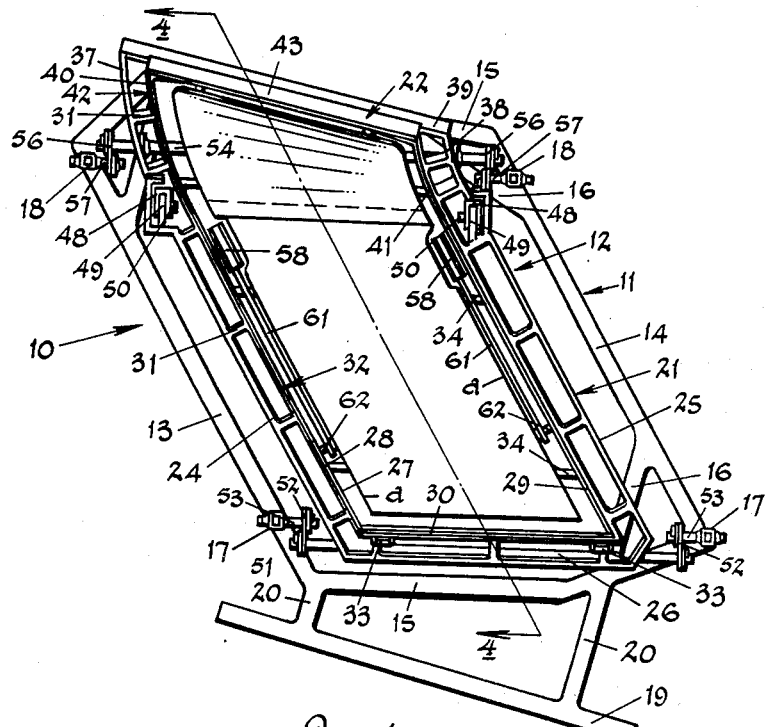
Fig. 1 is a perspective view of a hinged bending mold constructed in accordance with the invention.

With reference now to the drawings, and particularly to Fig. 1, there is shown a bending apparatus 10 constructed in accordance with the invention. The apparatus 10 comprises a rack 11 and a bending mold 12 supported above said rack. The rack 11, only a portion of which is shown, comprises a pair of spaced parallel side bars 13 and 14 connected to one another at their opposite ends by bent end bars 15 and braced by diagonal members 16. Extending upwardly from the rack side bars adjacent each of the opposite ends thereof, are pairs of uprights 17 and 18 the uprights of each pair being aligned with one another and supported on different side bars. As will be later described, these uprights serve to suspend the mold 12 above the rack 11. To guide the rack along the roll type conveyor used in most bending furnaces, a guide bar 19 is secured outwardly of the rack by means of spacing members 20.

Figure 2:
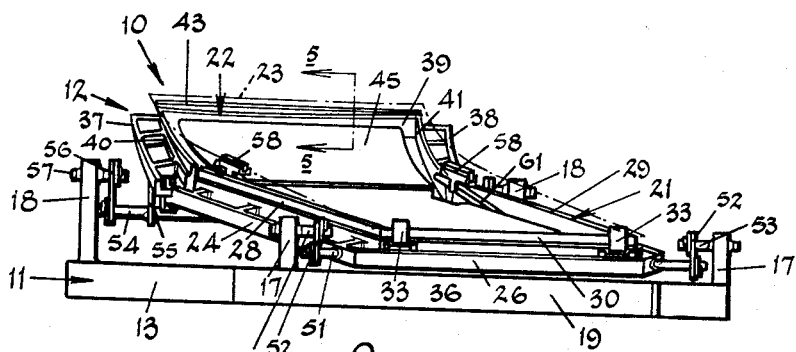
Fig. 2 is an end elevation of the mold shown in Fig. 1 when in the closed position.
Figure 3:
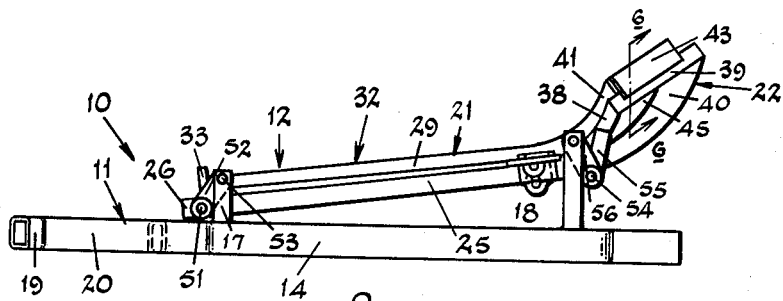
Fig. 3 is a side elevation of the mold shown in Fig. 1 when in the closed position.
Figure 4:
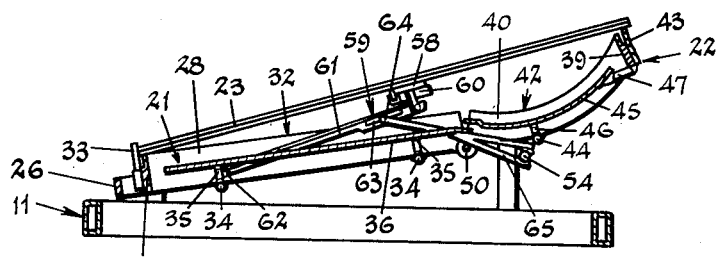
Fig. 4 is a longitudinal vertical section taken substantially along the line 4—4 of Fig. 1 showing the mold in the open position.
Figure 5:
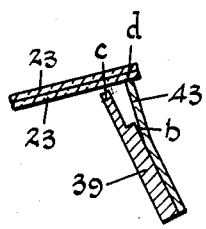
Fig. 5 is an enlarged sectional view taken along the line 5—5 of Fig. 2 when the mold is in the open position.
Figure 6:
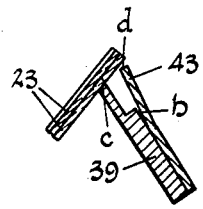
Fig. 6 is an enlarged sectional view taken along the line 6—6 of Fig. 3.

The mold 12 comprises a pair of mold sections 21 and 22 connected to one another for movement from an open position, as shown in Figs. 2 and 4, wherein a glass sheet, or pair of sheets 23, is received, to a closed position, as shown in Fig. 3 wherein the glass sheet, or pair of sheets, is bent to a predetermined curvature.

As best shown in Figs. 1 and 2, the lower mold section 21 comprises a pair of spaced side bars 24 and 25 secured to one another at their outermost ends by a skewed end bar 26. Carried within the confines of the side and end bars is a shaping rail 27 which comprises spaced substantially parallel side rails 28 and 29 rigidly joined to one another at their outermost ends by a skewed end rail 30, said end and side rails being secured to the adjacent end and side bars of the mold section 21 by a plurality of web members 31. Both the end and side rails have their upper edges finished to form a shaping surface designated in its entirety by the numeral 32. A pair of spaced locator blocks 33 are secured to the outer face surface of the rail 30 and, as later described, serve to position one edge of the sheets 23 to be bent upon said rail.

To impart rigidity to the lower mold sections, a pair of spaced rods 34 extend transversely between the side bars 24 and 25 and are rigidly secured to both the undersurfaces of said side bars and the rail sections 28 and 29. Extending upwardly from the rods 34 are relatively short stub member 35 which support a shield 36 spaced downwardly from the shaping surface 32. The shield preferably comprises a metallic plate and, as shown in Fig. 1, has its edges *a* spaced inwardly from the side and end portions of the shaping rail 27. As will be later described, this shield aids in forming a compression band in the marginal area of the glass sheets 23.

The upper mold section 22, similarly to the lower mold section 21, includes a pair of curved, spaced side bars 37 and 38 of unequal length and rigidly joined to one another at their outermost ends by a skewed end bar 39. Carried within the confines of the side bars is a pair of curved shaping rail sections 40 and 41 which are secured to their adjacent side bars by a plurality of additional web members 31 and have their outermost ends secured to the end bar 39. The side rail sections 40 and 41, in plan view, are curved somewhat similarly to their respective side bars 37 and 38, the rail 41 being the shorter of the two. As shown in Fig. 2, both the side rails 40 and 41 and the end bar 39 which acts as a shaping rail section have their upper surfaces formed to a concave curvature and finished to provide a shaping surface designated in its entirety by the numeral 42.

Rigidly fastened to the outer face surface *b* of the end bar 39 is a sheet support plate 43 which is substantially coextensive in length with the bar 39 and directed angularly away from the upper curved and finished edge *c* of said bar. The plate 43 has the upper edge *d* thereof formed as a substantially flat surface to initially receive in contact therewith the marginal edge portion of the lower glass sheet 23 when the mold 12 is in the open position of Fig. 4.

Secured to the undersurfaces of both the side bar and side rail portions of the upper mold section is a transverse stiffening rod 44. As shown in Fig. 4, a shield 45 is supported intermediate its ends upon the rod 44 by means of short upright members 46. The outer end of the shield 45 is supported by means of rods 47 extending inwardly from the end bar 39.

Similarly to the shield 36, the shield 45 is preferably made of metal and has its edges spaced inwardly from the side rail sections and end bar of the upper mold section. To provide a continuous shielding action by both the shields 36 and 45, the inner edge of the shield 45 overlaps the inner edge of the shield 36.

To movably join the mold sections 21 and 22 to one another, the inner end of each of the side bars 37 and 38 of the upper mold section 22 is formed as a yoke 48 to receive therewithin protruding portions 49 of the adjacent inner ends of the side bars 24 and 25 which form a part of the lower mold section 21. Each yoke is hingedly joined to the portion 49 of the side bar received therewithin by a pin 50 passed through axially aligned holes formed in both the yoke and the protruding side bar portions.

The lower mold section 21 is supported by means of a transverse rod 51 passed through the side bar sections 24 and 25 and is rigidly secured thereto. The opposite ends of the rod 51 extend outwardly from the side bars and are rotatably received in the lower ends of a pair of links 52 having their uppermost ends swingably secured to pins 53 fixedly received in the upper ends of the uprights 17. The uppermost mold section 22 is somewhat similarly supported and has a transverse rod 54 fixedly secured to the mold section by means of depending bar members 55 secured to the side bars 37 and 38. The opposite ends of the rod 54 extend outwardly from the side bars to be rotatably received in the lower ends of a similar pair of links 56 swingably mounted at their uppermost ends on pins 57 rigidly secured to the uprights 18.

The rod 54, as shown in Fig. 1, is angularly disposed with respect to the end bar 39 and the support plate 43. As will be later described, this angular relationship affords an axis of suspension for the plate 43 and the upper mold section 22 which is calculated to rotate the plate 43 through a twisting or conical path of movement during the closing action of the mold.

As an aid in supporting the pair of glass sheets 23 intermediate the ends thereof both prior to bending and during the bending thereof and also control the rate of closing of the mold, there is provided a pair of spaced support blocks 58 supported for movement by a linkage arrangement designated in its entirety by the numeral 59. These blocks 58 are preferably composed of a suitable insulating material which will not mar the glass when hot. As shown in Fig. 4, each of the blocks 58 is carried within a trough-like member 60 secured for vertical pivotal movement to the upper end of a rod 61 forming a portion of the linkage arrangement 59 and which has its opposite end pivotally secured by means of a pin 62 to one of the side sections of the shaping rail 27. Adjacent its end which receives the trough member 60, the rod 61 has an oblong ring or slot 63 formed therein for the purpose of engaging a pin-like end portion 64 of a triangular rod 65 forming the remaining portion of the linkage arrangement 59. The rod 65 has its triangularly shaped end rigidly secured to the transverse rod 54 supporting the upper mold section 22. As will be later described in detail, when the mold is in the open position, the support blocks 58 support the pair of sheets 23 to be bent inwardly of the ends thereof and during the bending of the sheets act to lower the same into conformity with the shaping surface of the respective mold sections.

In bending a glass sheet with the apparatus herein disclosed, the mold is moved to the open position of Fig. 4 by rotating the upper mold section 22 about its support rod 54. During the rotation of the upper mold section, the triangular rod 65 by virtue of its rigid attachment to the rotating rod 54, has the free or inner end thereof rotated upwardly thus carrying the blocks 58 therewith until the upper surfaces of the blocks are in a common plane defined by the upper edge of the shaping rail section 30 and the sheet support plate 43 which is substantially horizontal when the mold is in the open position. The pair of glass sheets 23 to be bent are then placed in position on the mold with the lowermost end edges of the sheets engaging the locator blocks 33 carried outwardly of the rail section 30, and the uppermost marginal edge portions of the sheets resting on the upper edge d of the plate 43. Intermediate their ends, the sheets are supported by the blocks 58 which, due to their engagement with the lowermost sheet, limit the extent to which the mold opens.

Due to the rigid character of the glass sheets in their cold condition, the weight thereof acting upon the plate 43 and the rail section 30 serves to retain the mold sections in the open spread-apart position of Fig. 4. The mold having the glass sheets thus supported thereon is then passed into a bending furnace maintained at temperatures sufficient to soften the sheet. As the sheets begin to soften, their rigidity is decreased and the sheets, under the influence of heat and gravity, have a tendency to sag downwardly toward the shaping surface of the mold sections. At this time, the upper mold section 22, at its upper end as defined by the plate 43, begins to rotate upwardly and inwardly carrying the upper edge portions of the glass sheets therewith. At the same time, due to the linkage arrangement, the support blocks 58 are drawn downwardly in synchronous movement therewith thus lowering the pair of glass sheets 23 toward the mold shaping surface in timed relationship with the closing movement of the mold sections.

In moving toward the mold shaping surface, the portion of the glass sheet between the support blocks 58 and the shaping rail section 30, generally speaking, moves downwardly in a substantially vertical plane of bending with the opposite edges of the sheets in said portion being retained in substantially the same horizontal planes during their downward movement. The portion of the glass sheets between the support blocks 58 and the plate 43, upon which the upper marginal edge portion of the lowermost sheet is received, however, is rotated angularly out of the plane of initial support and also the plane of vertical movement of the lower portions of the sheets to form a twist in the sheets prior to their contacting the mold shaping surface. More specifically, due to the angular relationship between the support plate 43 and the rod 54, which supports the upper mold section 22, the upper mold section in moving from the open to the closed position carries the upper edge d of the support plate 43 from its initially substantially horizontal position through a conical path of curvature to the angular position shown in Fig. 3. By so controlling the mold movement, the corresponding sheet portions supported on the plate 43 are rotated upwardly and inwardly in an angular relationship with respect both to the portion of the glass sheet between the blocks 58 and the rail section portion 30 and also with respect to the plane of initial sheet support. Thus, in bending, the glass sheets have the movement of the lower ends thereof adjacent the rail 30 restricted to movement substantially in the plane of bending whereas the opposite or upper ends of the glass sheet are rotatably moved at an angle to the plane of bending and also at an angle to the plane of initial support of the sheet and continue to thus move during the closing action of the mold until the twisted glass sheets are deposited on the mold shaping surface.

Before the mold sections have finished their movement into the closed position of Fig. 3, the rotation of the upper mold section plus the sagging of the sheet causes the concavely surfaced rail section 39 to engage the lowermost glass sheet immediately inwardly of the plate 43 and elevate the adjacent ends of the sheets above the plate. Since the sheets are lifted upwardly from the plate, there is no sliding engagement of the glass with either the plate or the rail section which would tend to cause optical distortion. Since the rail 39 is moving upwardly at the time of contacting the glass sheet, the force of rail movement plus gravity acting upon the sheets conforms the marginal area of the sheets to the concave curvature of the rail. By supporting substantially the entire length of the sheet ends during the initial portion of the bending step upon the linearly flat-surfaced plate 43, and engaging them with the arcuately surfaced member 39 while thus supported stress concentrations are avoided which would cause objectionable edge curl in the finally bent sheets.

After the twisted sheets have conformed to the mold shaping surface, the mold is passed through an annealing lehr wherein the temperature of the glass sheets is slowly reduced to approximately room temperature. While passing through the lehr, the portions of the sheets above the shields 35 and 45 and the mold sections shaping surfaces 32 and 40 are maintained at a higher temperature than the portions of the sheets between the edges $a$ of the shield and the shaping rail due to the residual heat within the metallic portions of the mold which cool at a slower rate than the glass. Thus, a marginal area of the sheet defined therein by the edges $a$ of the shields and the shaping surface cools at a faster rate than the portions immediately adjacent thereto and has compression stresses formed therein.

After leaving the annealing lehr, the glass sheet is removed from the mold and may be pattern-cut through this area of compression which in the finished pattern-cut sheet forms a relatively tough edge better adapted to withstand loads or shocks applied thereto.

It is also to be understood that the form of the invention disclosed herein is to be taken as the preferred embodiment thereof, and that various changes in the shape, size and arrangement of parts may be resorted to without departing from the spirit of the invention or the scope of the following claims.

We claim:

1. Apparatus for bending glass sheets, comprising a plurality of interconnected mold sections including a first movable mold section and a second movable mold section supported by a rack for movement from an open position in which a glass sheet is received to a closed position during bending of said sheet, said first and second movable mold sections together defining a glass sheet shaping surface of predetermined curvature, said first section comprising a pair of spaced substantially parallel shaping rails, said second section comprising a pair of curved spaced shaping rails of unequal length rigidly joined to one another at their outermost ends by a skewed end shaping rail having an arcuately surfaced sheet engaging edge, a glass sheet support plate fixedly secured to the outer face of said end shaping rail, said plate having a substantially flat edge for initially receiving one end of a glass sheet in contact therewith and supporting said sheet above the mold sections in position to be bent into contact therewith, and means for supporting said second section for movement from the open position in which the substantially flat edge of the support plate is in the plane of initial support of the glass sheet to the closed position in which said edge is disposed at an angle to the plane of initial support, said means comprising a transversely extending rod fixedly secured to said second section to form an axis of rotation of both said second section and said plate, said rod being angularly disposed with respect to said plate and extending outwardly from said curved shaping rails, and links swingably mounted at their uppermost ends on said rack, the opposed ends of said rod being rotatably received in said links.

2. Apparatus for bending glass sheets as defined in claim 1, wherein the support plate is directed angularly away from the arcuately surfaced sheet engaging edge of the skewed end shaping rail.

3. Apparatus as defined in claim 1, wherein the rod is mounted for movement on an axis located beneath and inwardly of the sheet support plate.

4. Apparatus for bending glass sheets as defined in claim 1, wherein the support plate is substantially coextensive in length with the end shaping rail.

References Cited in the file of this patent

UNITED STATES PATENTS

| | | |
|---|---|---|
| 2,348,278 | Boyles et al. | May 9, 1944 |
| 2,518,951 | Smith | Aug. 15, 1950 |
| 2,608,030 | Jendrisak | Aug. 26, 1952 |
| 2,608,799 | Babcock | Sept. 2, 1952 |
| 2,691,854 | Rugg | Oct. 19, 1954 |
| 2,695,476 | Jendrisak | Nov. 30, 1954 |
| 2,736,140 | Black | Feb. 28, 1956 |
| 2,744,359 | Jendrisak | May 8, 1956 |

FOREIGN PATENTS

| | | |
|---|---|---|
| 710,393 | Great Britain | June 9, 1954 |
| 727,200 | Great Britain | Mar. 30, 1955 |